(12) United States Patent
Hate

(10) Patent No.: US 10,181,238 B2
(45) Date of Patent: Jan. 15, 2019

(54) METHOD AND SYSTEM FOR PROVIDING ENTERPRISE BASED GAMIFICATION AS A SERVICE

(71) Applicant: Infosys Limited, Bangalore (IN)

(72) Inventor: Sudhanshu Hate, Pune (IN)

(73) Assignee: Infosys Limited, Bangalore (IN)

( * ) Notice: Subject to any disclaimer, the term of this patent is extended or adjusted under 35 U.S.C. 154(b) by 936 days.

(21) Appl. No.: 14/493,312

(22) Filed: Sep. 22, 2014

(65) Prior Publication Data

US 2015/0087407 A1 Mar. 26, 2015

(30) Foreign Application Priority Data

Sep. 23, 2013 (IN) .......................... 4293/CHE/2013

(51) Int. Cl.
| | |
|---|---|
| A63F 13/00 | (2014.01) |
| G07F 17/32 | (2006.01) |
| A63F 13/30 | (2014.01) |
| A63F 13/65 | (2014.01) |
| A63F 13/847 | (2014.01) |
| G06Q 10/10 | (2012.01) |

(52) U.S. Cl.
CPC .......... *G07F 17/3255* (2013.01); *A63F 13/30* (2014.09); *A63F 13/65* (2014.09); *A63F 13/847* (2014.09); *G06Q 10/103* (2013.01)

(58) Field of Classification Search
None
See application file for complete search history.

(56) References Cited

U.S. PATENT DOCUMENTS

| | | | |
|---|---|---|---|
| 9,569,801 B1* | 2/2017 | Xu | .......................... G06Q 50/01 |
| 2004/0193491 A1* | 9/2004 | Davis | ..................... G06Q 30/02 |
| | | | 705/14.17 |
| 2006/0200477 A1* | 9/2006 | Barrenechea | ..... G06F 17/30595 |
| 2007/0043691 A1* | 2/2007 | S | ............................. G06Q 10/00 |
| 2009/0149248 A1* | 6/2009 | Busey | ..................... A63F 13/12 |
| | | | 463/29 |
| 2012/0244948 A1 | 9/2012 | Dhillon et al. | |
| 2012/0259785 A1 | 10/2012 | Ha | |
| 2012/0270661 A1 | 10/2012 | Smith et al. | |
| 2013/0029760 A1* | 1/2013 | Wickett | .............. G07F 17/3267 |
| | | | 463/29 |

(Continued)

Primary Examiner — Meredith A Long
(74) Attorney, Agent, or Firm — Klarquist Sparkman, LLP

(57) ABSTRACT

The present invention provides a gamification platform to provide one or more gamification services to one or more users in an enterprise. In accordance with an embodiment, the gamification platform includes a server, an application component, a consumer component and a DB layer, wherein said components and the DB layer are communicably coupled to the server. The application component provides a unified and an integrated gamification mechanics across one or more enterprise applications and comprises a tracker, a rule engine and a recommendation engine. The consumer component is configured to support one or more types of client applications. The DB layer is configured to manage and manipulate data in underlying database. The gamification platform further allows one or more users to virtually engage in accomplishing one or more target activities as a team and publishes the one or more gamification services in a user interface of the client application.

24 Claims, 3 Drawing Sheets

(56) References Cited

U.S. PATENT DOCUMENTS

| | | | | |
|---|---|---|---|---|
| 2013/0171594 A1* | 7/2013 | Gorman | ................... | G09B 5/00 |
| | | | | 434/219 |
| 2013/0190094 A1* | 7/2013 | Ronen | ..................... | A63F 13/12 |
| | | | | 463/42 |
| 2013/0263083 A1* | 10/2013 | Reddy | ................ | G06F 9/45504 |
| | | | | 717/106 |
| 2013/0291065 A1* | 10/2013 | Jakowski | ................ | G06F 15/16 |
| | | | | 726/4 |
| 2013/0337909 A1* | 12/2013 | Pattison | ................. | A63F 13/60 |
| | | | | 463/29 |
| 2014/0024462 A1* | 1/2014 | Qiang | ................... | A63F 13/795 |
| | | | | 463/42 |
| 2014/0051506 A1* | 2/2014 | Ameling | ................ | G06Q 99/00 |
| | | | | 463/29 |
| 2014/0179408 A1* | 6/2014 | Ducheneaut | .......... | G07F 17/326 |
| | | | | 463/23 |
| 2014/0194198 A1* | 7/2014 | Gale | ................. | G06Q 30/0241 |
| | | | | 463/29 |
| 2014/0195272 A1* | 7/2014 | Sadiq | ..................... | G06Q 40/08 |
| | | | | 705/4 |
| 2014/0229217 A1* | 8/2014 | Bernier | .............. | G06Q 10/0631 |
| | | | | 705/7.16 |
| 2014/0274303 A1* | 9/2014 | Funches | ............ | H04L 29/06034 |
| | | | | 463/23 |
| 2014/0310013 A1* | 10/2014 | Ram | ...................... | G06Q 50/24 |
| | | | | 705/2 |
| 2015/0056578 A1* | 2/2015 | Olenick | ................ | G09B 19/18 |
| | | | | 434/108 |

* cited by examiner

METHOD AND SYSTEM FOR PROVIDING ENTERPRISE BASED GAMIFICATION AS A SERVICE

RELATED APPLICATION DATA

This application claims priority to India Patent Application No. 4293/CHE/2013, filed Sep. 23, 2013, the disclosure of which is hereby incorporated by reference in its entirety.

BACKGROUND

The invention in general relates to providing unified and integrated gamification mechanics to each activity accomplishment by one or more users of one or more applications in an enterprise. In particular, the invention relates to an enterprise based gamification platform and to a method and system for providing those unified and integrated gamification mechanics as services in a user interface of the one or more users of one or more applications in an enterprise.

Gamification is the application of gaming mechanics in a non-gaming context to engage users in resolving or accomplishing various tasks. Application of gamification strategy in any environment triggers greater involvement among the users as it influences and increases the natural gaming desires of those users. Recently, gamification techniques are applied in many applications to increase user involvement, to accomplish various tasks in a quick and competitive manner by the users of those applications and to increase return on investment. Introduction of such gamification techniques in various applications for accomplishing various tasks has increased the user involvement in using those applications and replaced the routine and mundane procedure followed to accomplish those tasks in a less competitive environment.

Enterprises have started implementing gamification mechanics in almost all applications. It was found that application of such gaming strategy to each and every application with same set of rules is cumbersome, confusing and time consuming. Moreover, for an enterprise to be successful in gamification and to harvest a reasonable return on investment it should effectively collaborate and synergies the three dimensions including People, Process and Technology. For gamification initiative on 'People' dimension, clear understanding on soft aspects such as individual or group motivational drivers, their age and gender profiles, individual and group psychology, and culture of the enterprise or organization is necessary. With regard to 'Process' dimension, descriptive study on having and implementing the right processes and governance mechanisms to deal, execute and sustain is very important. Finally, with regard to 'Technology' dimension, even after lot of emphasis in understanding, enterprises are not able to achieve its goal for the following reasons: Quick implementations to demonstrate the concept, approaching gamification as a timely solution to accomplish tasks rather than considering it as an enterprise solution which can be adapted to many applications and not being able to make clear choice between building a solution or to buy an enterprise solution for gamification. Apart from the 'Technology' dimension's restrictions, enterprises face difficulty to clearly demonstrate Return-On-Investment and custom building Gamification functionality as part of each application, project, will become duplication of code and effort over a long run.

To establish gamification technology and architecture for an enterprise and to overcome the above restrictions, enterprises should consider setting long term strategy to avoid duplication of effort across multiple applications and to adopt it across the enterprise portfolio. There has to be enterprise based gamification platform that can cater to multiple business functions, applications and to reduce duplication of effort spent on adapting gamification to each application of an enterprise.

Thus, there is a need for an enterprise based gamification platform that can provide unified and integrated gaming mechanics across various applications of an enterprise and a method and a system to provide enterprise based gaming mechanics as one or more services to one or more users of one or more applications in the enterprise.

SUMMARY

The present invention provides a gamification platform to provide one or more gamification services to one or more users in an enterprise. The gamification platform includes a server, an application component, a consumer component and a DB layer, wherein the application component, the consumer component and the DB layer are communicably coupled to the server. The server includes a processor, memory and a computer readable media. The application component provides a unified and an integrated gamification mechanics across one or more enterprise applications and comprises a tracker, a rule engine and a recommendation engine. The tracker is configured to track one or more activities of the one or more users and communicate the one or more activities accomplished by the one or more users to the rule engine. The rule engine is configured to define one or more unified rules and at least one reward for accomplishment of the one or more activities across the one or more enterprise applications by the one or more users. The recommendation engine is configured to suggest one or more target activities for accomplishing next reward to the one or more users. The consumer component is configured to support one or more types of client applications including a thick client application, a thin client application and a mobile client application. The DB layer is configured to manage and manipulate data in underlying database. The gamification platform further enables access to the one or more users of the enterprise via the consumer component, tracks the one or more activities and one or more rewards earned by the one or more users for accomplishment of the one or more activities via the application component and manages the one or more rewards earned in the underlying database via the DB layer.

The present invention also provides a system to deliver enterprise based gaming mechanics as one or more services to a user interface of a consumer application for one or more users of the enterprise. The system comprises a tracking component, a reward component, a suggestion component, a virtual team building component and a publishing component. The tracking component tracks one or more activities of the one or more users and communicates the one or more activities accomplished by the one or more users to a server. The reward component retrieves at least one reward for accomplishment of the one or more activities by the one or more users from a rule engine that is configured in the server. The suggestion component retrieves one or more target activities for accomplishing next reward from a recommendation engine that is configured in the server. The virtual team building component virtually engages the one or more users in accomplishing the one or more target activities as a team. The publishing component of the system publishes the one or more services in the user interface of the consumer application.

The present invention further provides a method to deliver enterprise based gaming mechanics as one or more services to a user interface of a consumer application for one or more users of the enterprise. The method includes tracking one or more activities of the one or more users and communicating the one or more activities accomplished to a rule engine, retrieving at least one reward for accomplishment of the one or more activities by the one or more users from the rule engine, suggesting one or more target activities for accomplishing next reward from a recommendation engine, building a team by the one or more users to virtually engage the one or more users in accomplishing the one or more target activities as a team and publishing the one or more services in the user interface of the consumer application.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
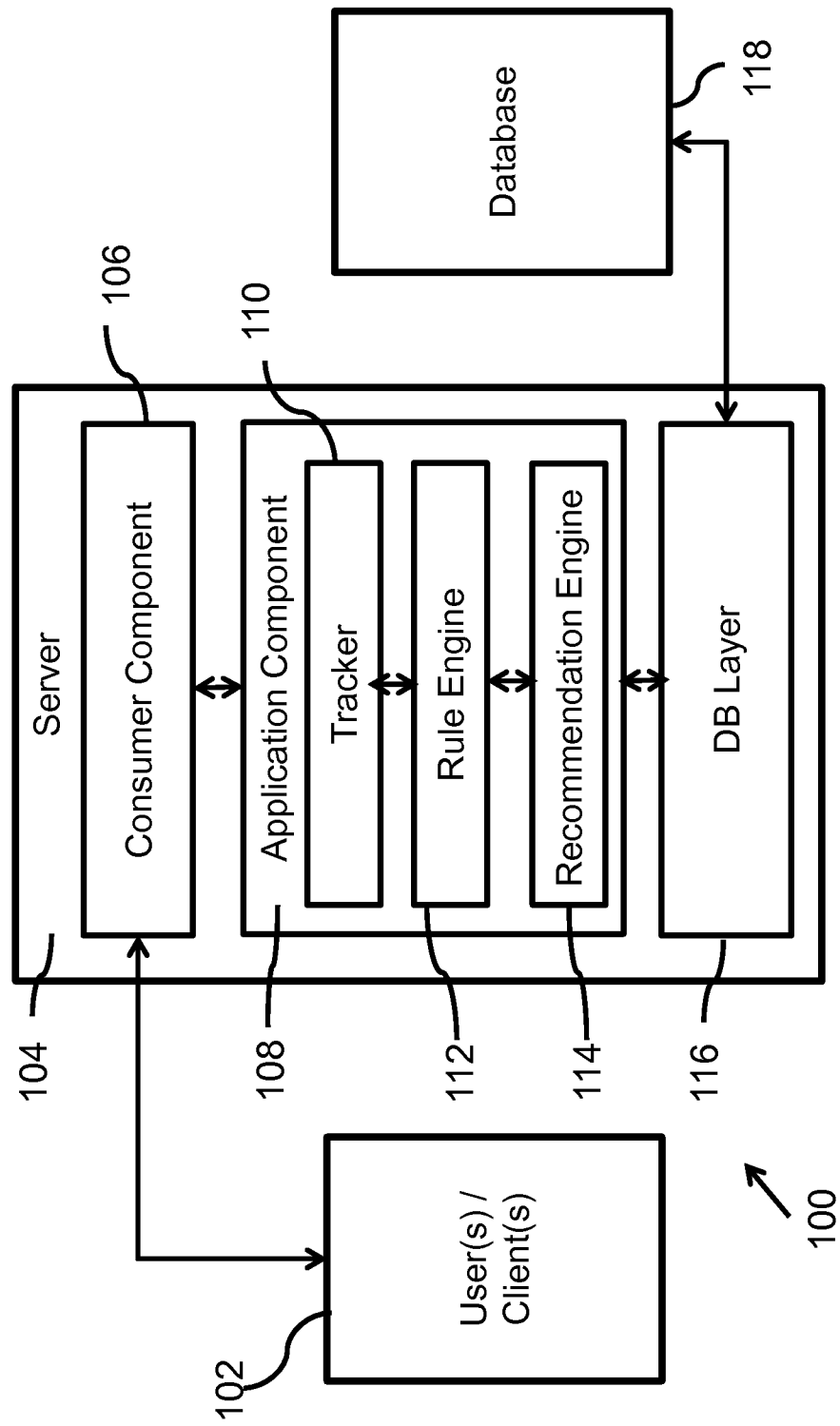
FIG. 1 is a block diagram of an enterprise based gamification platform 100 providing one or more gaming mechanics as services to one or more clients.

FIG. 1 is a block diagram of an enterprise based gamification platform 100 providing one or more gaming mechanics as services to one or more users or clients 102 of one or more applications of an enterprise, in accordance with an embodiment of the present invention. The enterprise based gamification platform 100 provides one or more gamification services to a consuming application of the one or more users or clients 102 through a server. The server 104 includes a processor, memory and a computer readable media. The computer readable media could be any one of an optical disk like: CD-ROM, DVD, and Business Card CD-ROM. Also, the enterprise based gamification platform 100 is configured to support multiple consuming application instances and the gamification platform can be adapted to any enterprise or organization.

The enterprise based gamification platform 100 further comprises a consumer component 106, an application component 108, and a DB Layer 116 communicably coupled to the server 104.

The consumer component 106 is configured to support one or more types of consuming applications and the one or more types of consuming applications include: a thick client application, a thin client application and a mobile client application. The consumer component 106 interoperates with the consuming application and transmits the requests from the one or more types of client applications to the server 104. The server retrieves relevant information from a database 118 and sends the relevant information to the one or more users or clients as a response. The interaction between the consuming applications and the server will be enabled through RESTful web services. The RESTful web services is a web Application Program Interface (API) implemented using HTTP and REpresentational State Transfer (REST) principles. The one or more users or clients 102 consume the enterprise based gamification platform services through RESTful web services and the RESTful web services is technology independent and can be consumed from one or more devices and the one or more consuming applications. The one or more devices include, but not limited to, a computer, a laptop, a mobile phone, a PDA, an electronic tablet and a phablet. The consumer component 106 further comprises UI widgets to provide enhanced user experience for gamified responses and delivered as RESTful web service to the one or more consuming applications.

The application component 108 is configured to provide a unified and an integrated gamification mechanics across one or more applications of an enterprise. The application component 108 further comprises: a tracker 110, a rule engine 112 and a recommendation engine 114. The tracker 110 is configured to track one or more activities of the one or more users of one or more applications of the enterprise and communicates the one or more activities accomplished by the one or more users to the rule engine 112. The rule engine 112 is configured to define unified and integrated rules for accomplishing the one or more activities across one or more applications of an enterprise and a reward for accomplishing the one or more activities. Unified rules across one or more applications of an enterprise enable setting unique rules at an enterprise level that will be applicable for each application of an enterprise. Integrated rules across one or more applications of an enterprise enable retrieving and tracking the collaborated activities accomplished and the rewards earned by the one or more users across one or more applications of the enterprise. The recommendation engine 114 is configured to suggest one or more target activities for accomplishing next reward to the one or more users of one or applications of the enterprise. The one or more target activities for accomplishing next reward comprises target activities for accomplishing next reward as an individual and target activities for accomplishing next reward as a team. The recommendation engine 114 provides suggestions based on rule based analytics and decision making algorithm. The application component 110 further comprises a reporting engine to monitor progress on gamification services consumed by the one or more consuming applications of the one or more users of the enterprise and generate one or more reports consolidating the progress.

The DB Layer 116, interoperates with an underlying database 118 and is configured to manage and manipulate data in the underlying database 118 based on the various information from the tracker, the rule engine, the recommendation engine and the one or more requests from the consuming application of one or more users of the enterprise.

Actors or users of the enterprise based gamification platform 100 includes: at least one administrator and one or more users of the one or more applications of the enterprise. The users of the enterprise based gamification platform 100 will be provided with role based access to the gamification platform. The at least one administrator defines one or more unified rules and at least one reward for accomplishment of one or more activities in the rule engine 112 for rewarding individual accomplishments and for rewarding accomplishments as a team. In an exemplary rule engine 112, the administrator can use configuration application to establish one or more unified rules, at least one reward for accomplishment of one or more activities, and at least one recognition for accomplishment of one or more activities include but are not limited to, badges, leaderboard status, levels, and loyalty points. The one or more unified rules sets one or more targets for accomplishing one or more activities in each level and decides the difficulty for next level of targets for accomplishing one or more activities by the one or more users and such targets for accomplishing one or more activities by the one or more users includes target accomplishments of activities as an individual and as a team. Rule Engine 112, further provides provision to unlock next level of targets only after accomplishing one or more target activities in the current level or zone, till then all the other levels will be in a locked mode or will be inaccessible to the one or more users of the one or more applications of the enterprise.

At least one reward for accomplishment of one or more activities comprises at least one: recognition, a loyalty point and virtual money. Recognition includes at least one of achievement badge and unlocking next level.

The enterprise based gamification platform 100 also provides provision to redeem accumulated loyalty points by one or more users to purchase products in a linked e-commerce website. The virtual money rewarded can be awarded in terms of U.S. dollars and this can be converted to any currency based on the one or more user's preference and through a currency converter. The converted currency based on the one or more user's preference can be credited into the one or more user's bank account as and when required by the user. The currency converter is dynamic and updates the current currency value based on the fluctuating universal currency conversion rates. The enterprise based gamification platform 100, based on the accrued loyalty points or rewards further allows one or more users to virtually build a team by virtually buying one or more users using the accrued loyalty points and play as a team in achieving team based target accomplishments.

The enterprise based gamification platform 100 further provides provisions to publish one or more gamification services as notifications in a user interface of the consuming application for one or more users of the enterprise, wherein the one or more gamification services comprises: one or more activities accomplished by one or more users as an individual and as a team, at least one reward for accomplishment by the one or more users accomplished as an individual and as a team, one or more target activities for accomplishing next reward or unlocking next zone as an individual and as a team, at least one potential competitor for the current user and for the current virtual team, user accumulated loyalty points or virtual money, badges collected, levels unlocked by the one or more users as an individual and as a team, and leaderboard for an application.

Exemplary Rules for Exemplary Business Scenarios

One or more of the above described rules can be mapped to any business scenario of an enterprise to increase user involvement and return on investment through gamification strategy. In an exemplary embodiment such mapping can be elaborated in detail as follows. Several client facing websites are driven by KPIs such as total monthly new registrations and number of new users logging in. A rule can be set for new user registration for which the new user will be rewarded with a loyalty point or virtual currency, or a rule can be set for rewarding users for inviting friends to use those websites. When such friend becomes a website user, a rule can be set to reward the user and the friend with a loyalty point or virtual currency. In e-commerce retail sites and banking websites, the revenue depends on total number of users using web channel to perform a transaction. In that scenario, a rule can be set for every time a user logs into such retail site or banking website to perform a transaction, the user will be rewarded with a loyalty point or virtual currency. Several websites gather various information about the user to conduct user preference based analytics for targeting contents. In that case, a rule can be set for one or more activities involved in editing the user profile to include user preferences, the user will be rewarded with a loyalty point or virtual currency. Crowd sourcing sites encourages collective intelligence through forums and blogs. In that case, a new rule can be set to reward a loyalty point or virtual currency to users who initiate a thread or view a forum. Social networking sites encourage user interactions, in that case a new rule can be set to reward a loyalty point or virtual currency to users who tags a photo, comments on a photo, rates a post in a social networking site.

High level enterprise vision of gamification strategy implemented in enterprise based gamification platform 100 help in reducing duplication of effort and improves re-use along the following fronts like: designing UI components, services, business logic components, rules definition, information modeling, database schema design, and reporting templates.

Figure 2:
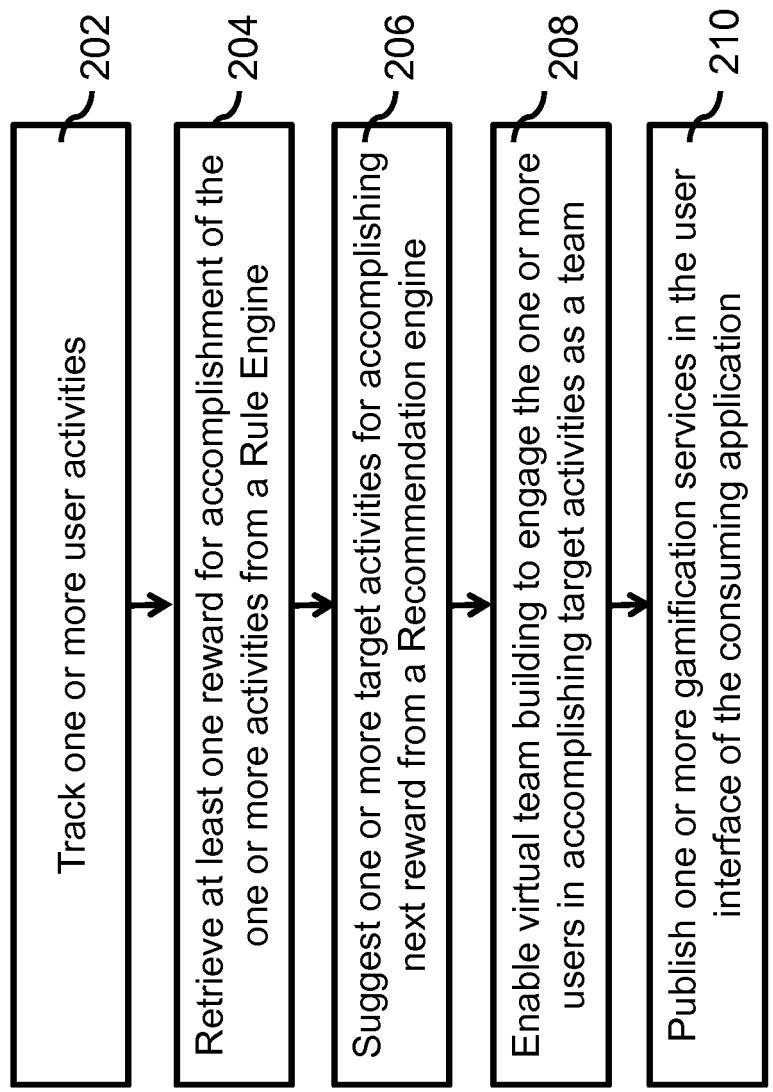
FIG. 2 is a flowchart illustrating a method for providing enterprise based gaming mechanics as one or more services to a user interface of a consumer application.

FIG. 2 is a flowchart describing a method to deliver enterprise based gaming mechanics as one or more services to a user interface of a consuming application for one or more users of the enterprise, in accordance with an embodiment of the present invention.

The process of delivering enterprise based gaming mechanics as one or more services to a user interface of a consuming application for the one or more users of the enterprise, involves the following steps:

At step 202, track one or more user activities of the one or one or more users of the enterprise and communicate the one or more activities accomplished by the one or more users to a rule engine and to a database.

At step 204, retrieve at least one reward for accomplishment of the one or more activities from the rule engine. The at least one reward for accomplishment includes a reward for accomplishment of activities as an individual and as a team. The at least one reward for accomplishment of one or more activities comprises at least one: recognition, a loyalty point, and virtual money. The recognition includes at least one of an achievement badge and unlocking a next level.

At step 206, suggest one or more target activities for accomplishing next reward from a recommendation engine. The recommendation engine provides suggestions based on rule based analytics and decision making algorithm. The one or more target activities for accomplishing next reward comprises target activities for accomplishing next reward as an individual and target activities for accomplishing next reward as a team.

At step 208, enable virtual team building based on the accrued loyalty points or rewards by virtually buying one or more users using the accrued loyalty points and play as a team in achieving team based target accomplishments.

At step 210, publish one or more gamification services in the user interface of the consuming application of the one or more users of the enterprise, wherein the one or more gamification services comprises: one or more activities accomplished by one or more users as an individual and as a team, at least one reward for accomplishment by the one or more users accomplished as an individual and as a team, one or more target activities for accomplishing next reward or unlocking next zone as an individual and as a team, at least one potential competitor for the current user and for the current virtual team, user accumulated loyalty points or virtual money, badges collected, levels unlocked by the one or more users as an individual and as a team, and leaderboard for an application.

Exemplary Computing Environment

Figure 3:
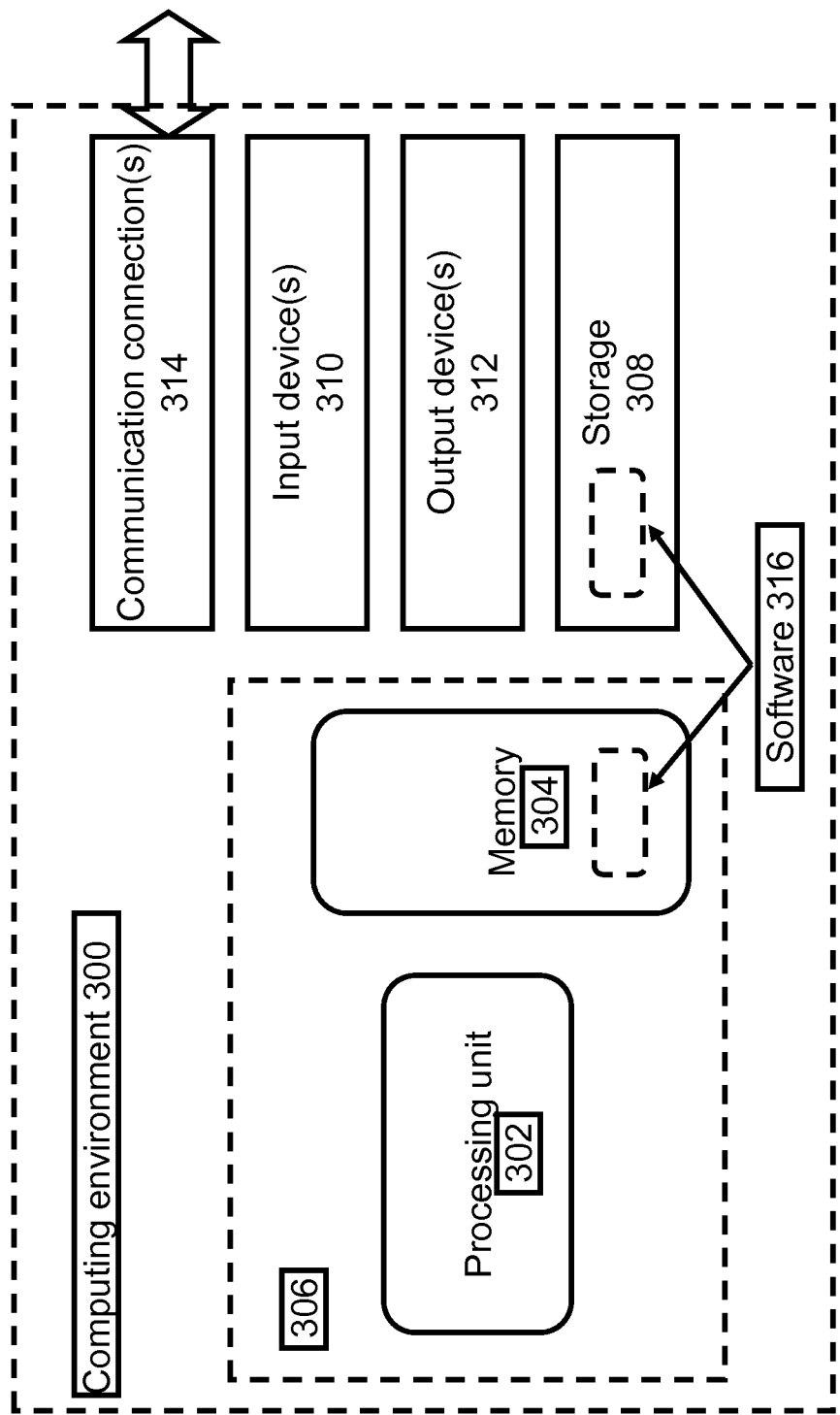
FIG. 3 illustrates a generalized example of a computing environment 300.

One or more of the above-described techniques can be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 302 and memory 304. In FIG. 3, this most basic configuration 306 is included within a dashed line. The processing unit 302 executes computer-executable instructions and may be a real or a virtual processor. In a multi-processing system, multiple processing units execute computer-executable instructions to increase processing power. The memory 304 may be volatile memory (e.g., registers, cache, RAM), non-volatile memory (e.g., ROM, EEPROM, flash memory, etc.), or some combination of the two. In some embodiments, the memory 304 stores software 316 implementing described techniques.

A computing environment may have additional features. For example, the computing environment 300 includes storage 308, one or more input devices 310, one or more output devices 312, and one or more communication connections 314. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 308 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 308 stores instructions for the software 316.

The input device(s) 310 may be a touch input device such as a keyboard, mouse, pen, trackball, touch screen, or game controller, a voice input device, a scanning device, a digital camera, or another device that provides input to the computing environment 300. The output device(s) 312 may be a display, printer, speaker, or another device that provides output from the computing environment 300.

The communication connection(s) 314 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 304, storage 308, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer-implemented gamification platform to provide one or more gamification services to one or more users in an enterprise, the gamification platform comprising one or more processors and one or more memories in communication with the one or more processors, the one or more memories comprising computer-executable instructions for performing operations comprising, for each of a plurality of enterprise software applications sharing a common gamification interface:
   receiving at least one user action for a software application of the plurality of enterprise software applications, the at least one user action associated with a user having a user identifier, wherein each of the plurality of enterprise software applications is in communication with a database through a database layer and at least a portion of the plurality of enterprise software applications share a common database schema for gamification data;
   recording in the database the at least one user action with a tracker component;
   comparing the at least one user action with one or more gamification rules for a unified and an integrated gamification mechanics across the plurality of enterprise software applications;
   determining that the user action meets at least one reward criteria associated with at least one unified rule across the one or more enterprise applications;
   crediting a user account associated with the user identifier with a reward associated with the at least one reward criteria;
   causing a database entry to be written, the database entry comprising the reward and associating the reward with the user account;
   determining from one or more unified gamification rules of the gamification mechanics a next achievement for the user using rule based analytics and decision making algorithm, the next achievement being associated with a next reward, wherein the one or more unified gamification rules are utilized by the plurality of enterprise software applications;
   determining one or more target activities for meeting the next achievement; and
   causing the one or more target activities to be displayed to the user on a display comprising a plurality of user interface components, wherein at least one of the user interface components is used for multiple applications of the enterprise software applications.

2. The computer-implemented gamification platform of claim 1, wherein the one or more unified gamification rules comprise one or more individual activities and one or more team activities, and the operations further comprise:
   determining whether the user action meets reward criteria for at least one individual activity or at least one team activity.

3. The computer-implemented gamification platform of claim 1, the operations further comprising:
   receiving input from at least one administrator to define or modify the at least one unified rule and at least one reward for accomplishment of one or more activities associated with the at least unified rule, wherein the at least one reward for accomplishment of at least one activity includes a reward for accomplishment of at least one activity as an individual and as a member of a team.

4. The computer-implemented gamification platform of claim 1, wherein the determined one or more target activities for accomplishing the next reward includes at least one target activity for accomplishing the next reward as an individual and at least one target activity for accomplishing the next reward as a team.

5. The computer-implemented gamification platform of claim 1, wherein the next reward is at least one reward defined for accomplishment of one or more activities in a forthcoming level or in a forthcoming zone.

6. The computer-implemented gamification platform of claim 1, wherein the user is a first user, the operations further comprising:
   receiving a request from the first user to add a second user to a team comprising the first user;
   querying the database for a reward balance of the first user;
   determining that the reward balance is sufficient to invite the second user to join the team;
   sending a request to the second user to join the team; and
   causing at least one target team activity to be displayed to the first and second users.

7. The computer-implemented gamification platform of claim 1, wherein the one or more gamifications rules define one or more achievements being defined in a plurality of levels, wherein the one or more achievements in a second level are locked until the user completes at least one achievement of the one or more achievements in a first level.

8. The computer-implemented gamification platform of claim 7, wherein at least one user interface component is reused between the plurality of enterprise software applications.

9. The computer-implemented gamification platform of claim 1, wherein at least one user interface component is reused between the plurality of enterprise software applications.

10. The computer-implemented gamification platform of claim 1, wherein the plurality of enterprise software applications share a common database schema.

11. The computer-implemented gamification platform of claim 1, wherein the user is a first user, the operations further comprising identifying a second user as a potential competitor to the first user.

12. The computer-implemented gamification platform of claim 1, wherein one or more unified rules set one or more targets for accomplishing one or more activities in each of a plurality of levels of activity and define a difficulty for a next level of targets for accomplishing one or more activities.

13. The computer-implemented gamification platform of claim 12, further comprising receiving input from an administrative user setting the one or more targets and the difficulty.

14. The computer-implemented gamification platform of claim 1, wherein user activity information from the plurality of enterprise software applications is aggregated.

15. The computer-implemented gamification platform of claim 1, wherein user activity information is received via HTTP and REST services and the plurality of enterprise software applications share one or more of UI component design, business logic components, rules definition, information modeling, database schema design, and reporting templates.

16. A system to provide an enterprise based gaming mechanics as one or more services to a user interface of a consumer application for one or more users of the enterprise, the system comprising one or more processors coupled to one or more memories, the one or more memories storing computer-executable instructions for performing operations comprising:

receiving one or more user actions for a software application of a set of enterprise software applications sharing a common gamification interface, the user actions being associated with user identifiers for a respective user, wherein each software application of the set is in communication with a database through a database layer and at least a portion of the software applications in the set share a common database schema for gamification data;

tracking one or more activities of the one or more users;

communicating one or more activities accomplished by the one or more users to a server;

retrieving from the database at least one reward for accomplishment of the one or more activities by the one or more users from a rule engine configured in the server and associated with the set of enterprise software applications;

determining that the one or more user actions meet criteria associated with the reward;

crediting at least one user account with the at least one reward based at least in part on determining that the one or more user actions meet the criteria;

determining a next reward defined by gamification rules for a unified and integrated gamification mechanic for the set of enterprise software applications, the next reward being associated with one or more user actions with one or more software applications of the set of enterprise software applications;

determining one or more suggested target activities with the one or more software applications of the set of enterprise software applications for accomplishing the next reward from a recommendation engine configured in the server, the one or more suggested target activities being determined using rule based analytics and decision making algorithm; and publishing the one or more services in the user interface of the consumer application, the publishing comprising causing a notification to be displayed to a user of the one or more users that the at least one reward was awarded and causing the one or more target activities to be displayed to the user.

17. The system of claim 16, the operations further comprising:

receiving input from at least one administrator to define or modify the at least one reward for accomplishment of one or more activities in the rule engine configured in the server, wherein the at least one reward for accomplishment of at least one activity includes reward for accomplishment of at least one activity as an individual and as a member of a team.

18. The system of claim 17, wherein the one or more target activities for accomplishing the next reward includes at least one target activity for accomplishing the next reward as an individual and at least one target activity for accomplishing the next reward as a team.

19. The system of claim 16, wherein the next reward is at least one reward defined for accomplishment of one or more activities in a forthcoming level or in a forthcoming zone.

20. A computer-implemented method to provide an enterprise based gaming mechanics as one or more services to a plurality of enterprise software applications sharing a common gamification application component for one or more users of the enterprise, the computer-implemented method comprising:

receiving one or more user actions of the one or more users with one or more of the plurality of enterprise software applications, the users being associated with user identifiers, wherein the plurality of enterprise software applications are in communication with a database through a database layer and at least a portion of the plurality of enterprise software applications share a common database schema for gamification data;

tracking the one or more user actions and recording at least a portion of the tracked one or more user actions;

communicating the one or more user actions to a rule engine;

determining that at least a portion of the one or more user actions satisfy accomplishment criteria for one or more activities defined for gamification rules for a unified and integrated gamification mechanic across the plurality of enterprise software applications;

retrieving from the database at least one reward for accomplishment of the one or more activities by the one or more users from the rule engine;

crediting an electronic account of at least one user of the one more users, and associated with the respective user identifier of the at least one user, with the reward;

determining from the one or more gamification rules a next achievement, the next achievement being associated with a next reward and comprising one or more target activities using one or more of the plurality of enterprise software applications for achieving the next reward;

determining at least one of the one or more target activities as a suggested target activity; and causing the suggested target activity to be displayed to at least one user of the one or more users on a display comprising a plurality of user interface elements, wherein at least one of the user interface elements is used for multiple applications of the plurality of enterprise software applications.

21. The computer-implemented method of claim 20, further comprising:

receiving input from at least one administrator to define or modify at least one reward for accomplishment of one or more activities in the rule engine, wherein the at least one reward for accomplishment of at least one activity includes reward for accomplishment of at least one activity as an individual and as a member of a team.

22. The computer-implemented method of claim 21, wherein the determined one or more target activities for accomplishing the next reward includes at least one target activity for accomplishing the next reward as an individual and at least one target activity for accomplishing the next reward as a team.

23. The computer-implemented method of claim 20, wherein determining at least one of the one or more target activities as a suggested target activity is based at least in part on outcomes of rule based analytics and decision making algorithm.

24. The computer-implemented method of claim 20, wherein the next reward is at least one reward defined for accomplishment of one or more activities in a forthcoming level or in a forthcoming zone.

\* \* \* \* \*